G. R. KIDDER,
Assignor, by mesne assignments, to himself, A. D. TAYLOR and B. J. FLUMMERFELT.
Sliding Door.
No. 9,675. Reissued April 19, 1881.
FIG. I.
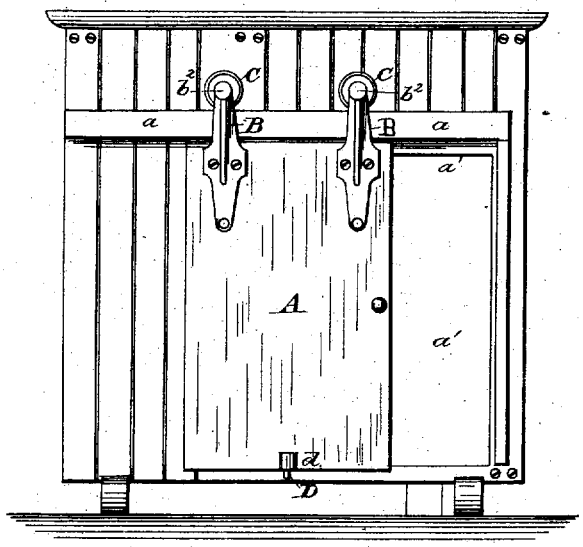
FIG. III.
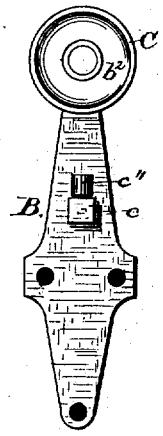
FIG. II.
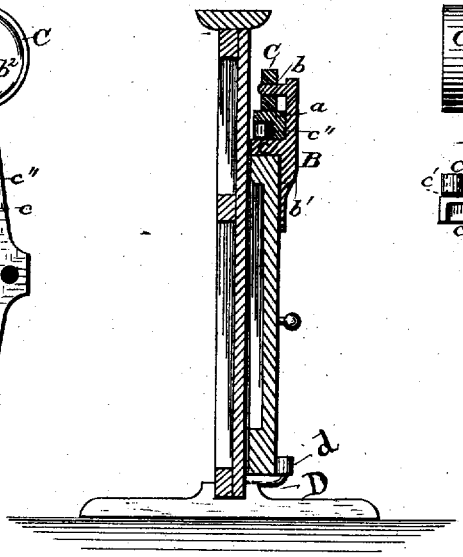
FIG. IV.
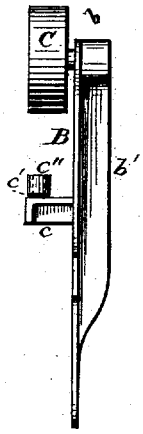
WITNESSES:
J. A. Rutherford.
James M. Wright Jr.
INVENTOR:
George R. Kidder,
By Geo. H. Lothrop.
Attorney.
N. PETERS, PHOTO-LITHOGRAPHER, WASHINGTON, D. C.

UNITED STATES PATENT OFFICE.

GEORGE R. KIDDER, OF ARMADA, MICHIGAN, ASSIGNOR, BY MESNE ASSIGNMENTS, TO HIMSELF, ADRIAN D. TAYLOR, AND BYRON J. FLUMMERFELT.

SLIDING DOOR.

SPECIFICATION forming part of Reissued Letters Patent No. 9,675, dated April 19, 1881.

Original No. 203,051, dated April 30, 1878; Reissue No. 8,789, dated July 8, 1879. Application for reissue filed February 5, 1881.

*To all whom it may concern:*

Be it known that I, GEORGE R. KIDDER, of Armada, in the county of Macomb and State of Michigan, have invented certain new and useful Improvements in Sliding Doors; and I do hereby declare that the following is a full, clear, and exact description of the invention, which will enable those skilled in the art to which it appertains to make and use the same, reference being had to the accompanying drawings, which form a part of this specification.

Figure I is a front view of my improved sliding door or gate. Fig. II is a sectional view of the door and one of the hangers. Figs. III and IV are detached views.

This invention appertains to certain improvements in sliding doors or gates, and has reference particularly to hanging and guiding the door or gate, by which it is caused to run more easily and with less friction, and the opening and closing of the same thus facilitated and held securely on the track on which it runs.

The nature of this invention consists, first, in the peculiar construction of the hangers to which the pulleys are attached, and by which the door or gate is hung; second, in the use of a flat-faced pulley or bearing wheel to support the door, running upon a track whose upper surface is plane, and which has on its under surface a groove for the reception of a suitable guide, thereby preventing lateral displacement of the door; and, third, in the combination, with the pulleys and hangers on which the door or gate is hung, of a bent bar or support having a frictional roller arranged in contact with said door or gate for guiding the same.

In the annexed drawings, A is a door or gate hung or suspended from an elevated track, *a*, extending over the gateway or opening *a'* by means of hangers B B. The track *a* has a plane upper surface, and may be conveniently and cheaply made of wood. In the under surface of the track *a* is a groove (shown in the drawings) running the whole length of the track.

B B are hangers or brackets, at the upper ends of which are right-angled arms *b*, which serve as axes for the pulleys C C. The point of attachment of the arms *b* to the hangers B may be strengthened or re-enforced by a web or rib, *b'*, cast or formed therewith. Upon the axes *b*, on each side of the pulley C, are ears or disks $b^2$, one of each pair of which may be removable, to permit a broken or imperfect pulley to be removed and replaced by a new one.

C C are flat-faced pulleys or bearing-wheels for supporting the door and allowing it to be easily moved.

*c* is an arm, cast or otherwise formed upon the hanger or bracket B, carrying on its end an upwardly-projecting stud, *c'*, on which there may be a friction-roller, *c''*. This stud *c'* extends up into and runs in the groove on the under side of track *a*, and prevents lateral displacement of the door.

D is a bent or angular bar fastened beneath the door or gate A, and extending up alongside thereof, which extension is provided with a frictional roller, *d*, arranged close to or in contact with the door or gate, to guide the latter in its movement.

By this construction of the track and use of a flat-faced pulley I entirely avoid the difficulty occasioned by ice and snow, or by the warping of the door in sliding doors hung on a grooved wheel, or in sliding doors hung on a flanged wheel, or on a track having a groove in its upper surface, while at the same time the door is effectually secured against lateral displacement by the arm *c* and stud *c'* running in the groove on the under side of track *a*.

I do not claim a door-hanger having a grooved roller running on a track having a rib on its upper face which sets within the groove of the roller. Nor do I claim a sliding door in which the upper edge of the door runs in a guide-groove. In such class of devices for hanging doors the warping of the track or of the door renders it exceedingly difficult, and often impossible, to slide the door, owing to the binding action of the parts. Neither do I broadly claim a hanger provided with a plane-faced roller running on a plane-faced track or platform, as such, of itself, is not my invention.

By the combination of devices present in the structure claimed by me the suspended door is not only prevented from displacement, by reason of the vertically-projecting guides running in the groove on the under side of the track, but the warping of the track does not affect the free and smooth rotary movement of the wheels on the hanger.

What I claim as my invention, and desire to secure by Letters Patent, is—

1. A door or gate hanger composed of a bracket adapted to be secured to the face of a door, which bracket has an arm, upon which is pivoted a flat-faced roller, which supports and carries the door, and has also an arm with a guide or roller adapted, in connection with a suitable guide, to prevent the door from displacement in any direction, substantially as described.

2. In combination with a hanger provided with a vertical bearing-wheel and a guide, the platform or track *a*, provided with a groove upon its lower face to receive the guide, substantially as described.

3. In a sliding door which is suspended from its upper end, the combination of the following elements, to wit: a vertical hanger attached to the upper end of the door and provided with the plane-faced rotary wheel, an elevated track or platform constructed on its upper side with a plane bearing-face for the free movements of the wheel, and on its under side with a longitudinal grooved guideway, and a guide connected with the door beneath the track or platform, and projecting upwardly into the grooved guideway on the under side of said track or platform, all substantially as and for the purpose described.

4. A hanging for a sliding door or gate, consisting of a bearing-roller, C, secured to a bracket, as described, and a stop or guide, *c'*, combined with the angular bar D, provided with a friction-roller, *d*, substantially as and for the purpose set forth.

GEO. R. KIDDER.

Witnesses:

DWIGHT N. LOWELL,

J. S. BAXTER.